J. W. ODANIEL.
WAGON-BRAKE.

No. 176,544.

Patented April 25, 1876.

WITNESSES:
C. Neveux
John Goethals

INVENTOR:
J. W. Odaniel
BY
[signature]
ATTORNEYS.

UNITED STATES PATENT OFFICE.

JOHN W. ODANIEL, OF CLOVERDALE, INDIANA.

IMPROVEMENT IN WAGON-BRAKES.

Specification forming part of Letters Patent No. 176,544, dated April 25, 1876; application filed March 13, 1876.

*To all whom it may concern:*

Be it known that I, JOHN W. ODANIEL, of Cloverdale, in the county of Putnam and State of Indiana, have invented a new and Improved Wagon, of which the following is a specification:

The invention consists in a brake-operating mechanism of the construction hereinafter fully described, and then pointed out in the claim.

Figure 1:
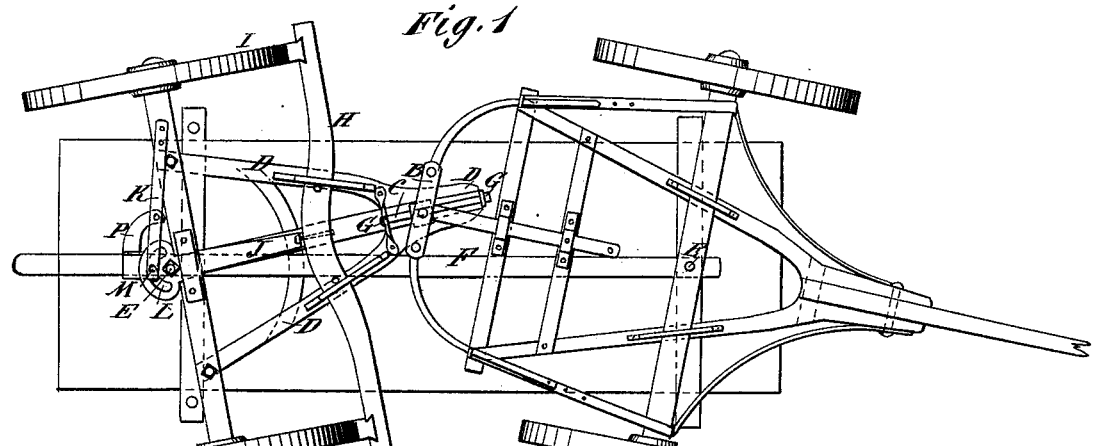
Figure 2:
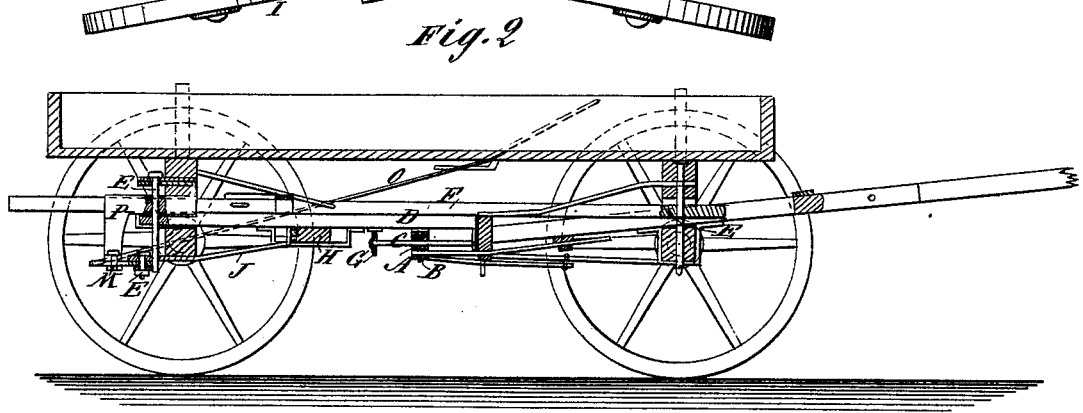
Figure 3:
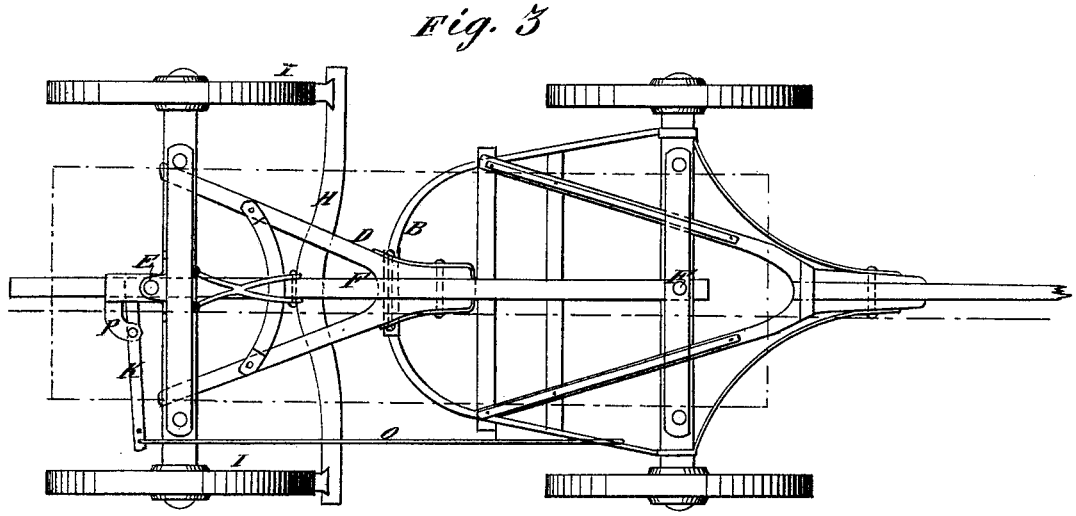

Figure 1 is a plan view of the wagon inverted. Fig. 2 is a longitudinal sectional elevation. Fig. 3 is a top view.

Similar letters of reference indicate corresponding parts.

The joint by which the front and hind gears are coupled, so that both may oscillate in turning around curves, as indicated in Fig. 1, consists of the tubular nut A, swiveled to the rear bar B of the front gear, and the rod C attached to the under side of the rear hounds D near the front end, and fitted in said nut so as to slide freely, the said rod being extended before and behind the nut to allow it to slide as the distance between centers E of the reach F varies. The hounds D overlap bar B to mount the supports G of the rod C on opposite sides of the nut. The brake-bar H is carried on the hounds D, so as to oscillate with them and the wheels I, and is fitted to slide forward and backward suitably for engaging the wheels and releasing them, and it is connected by bar J with the lever K, to work it, said bar being connected to pivot E by a slot allowing it to slide forward and backward to pull and push the brake, and connected to the lever by a curved slot, L, and pin M, allowing it to swing with the wheel while the lever for working it, which is pivoted to an arm, O, fitted on the reach, remains in the same relation to the bed or box N at all times, so that a rod, O, and hand-lever or other device connected to the bed or box for working it, remains undisturbed by the oscillations of the brake. The arm P is adjustable along the reach for adjusting the brake of the wheels.

Having thus described my invention, I claim as new and desire to secure by Letters Patent—

The brake H of an oscillating gear coupled to the brake-lever K by the bar J, fitted to slide on the center pivot E, and having the curved slot L for the coupling-pin M, substantially as specified.

JOHN W. ODANIEL.

Witnesses:
    THOMPSON BROWN,
    THOMAS J. O. DANIEL.